May 7, 1957
P. A. NEWMAN
2,791,016
LOCKING HOOK
Filed July 30, 1954
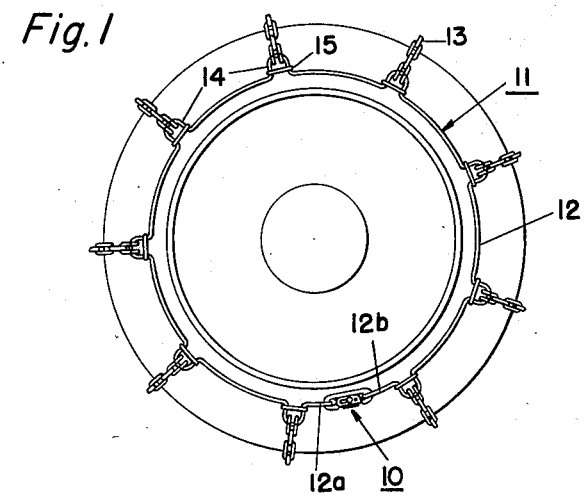
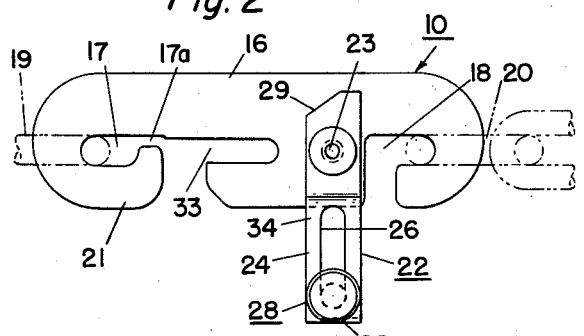
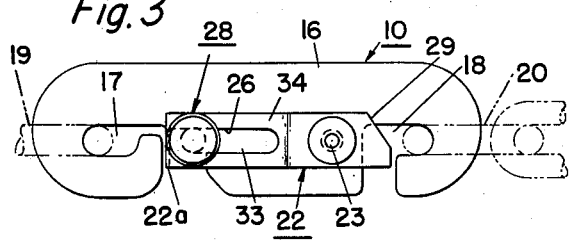
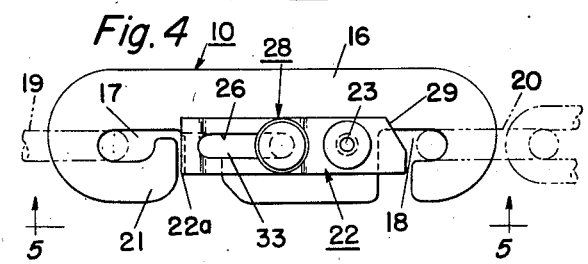
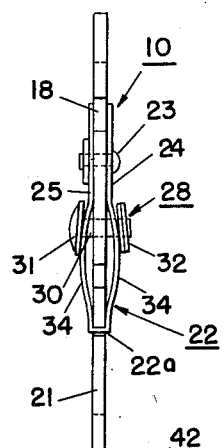
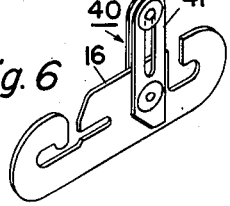

United States Patent Office 2,791,016
Patented May 7, 1957

2,791,016

LOCKING HOOK

Paul A. Newman, Philadelphia, Pa.

Application July 30, 1954, Serial No. 446,777

9 Claims. (Cl. 24—73)

This invention relates to a device for detachably securing parts to be connected, and more particularly to a locking hook for positively engaging and maintaining the parts in predetermined relation; and has for an object the provision of a connecting device whose effectiveness is not disturbed by forces tending to move the parts relative to one another.

Another object of the present invention is to provide in a connector a locking means which is positive acting, of simple construction and possessed of the characteristic of ease of operation.

In carrying out the objects of the present invention, there is provided in a locking hook for securing parts to be connected a body portion having an open-ended slot at one end thereof for receiving one of the parts. A closure member is pivotally mounted on a side of the body portion and extends in one direction over a portion of the slot for substantially closing the open end thereof to retain the part contained therein. In a portion of the closure member extending away from the open-ended slot there is provided a longitudinal slot which overlies an aperture in the body portion when the member is in a closed position. A locking means passes from one side of the closure member to an opposite side of the body portion and slides along the apertures in one direction to free the closure member for movement about its pivotal axis to open the end of the open-ended slot and slides in an opposite direction to mutually engage the body portion and the closure member to maintain the closure member in its closed or locked position.

The closure member is preferably comprised of resilient sheet material and is provided with a slight bulge intermediate the ends of its aperture or slot for maintaining the locking means in a locking position.

In another aspect of the invention, the closure member is provided with a sloping surface at one end thereof which is subject to being contacted by the part received by the body portion. Contact between the part and the end of the closure member will tend to move the member in a direction to further close the end of the slot, thereby preventing the unlatching and the ultimate release of the part from the body portion.

For a more detailed disclosure of the invention and for further objects and advantages thereof, reference is to be had to the following description taken in conjunction with the accompanying drawings, in which:

Fig. 1 is a reduced plan view of a tire chain assembly including the present invention;

Fig. 2 is a full scale plan view of the present invention illustrating the closure member in an open position;

Fig. 3 is a plan view of the present invention illustrating the closure member in a closed position;

Fig. 4 is a plan view illustrating the position of the locking means securing the closure member in a closed position;

Fig. 5 is an end elevation view taken along the line substantially corresponding to line 5—5 of Fig. 4 illustrating the deformed portions of the closure member; and Fig. 6 illustrates, in perspective, a locking hook embodying a modified form of closure member.

Referring to the drawings, there is illustrated in Fig. 1 a locking hook 10 associated with a tire chain or skid chain assembly 11 which is similar to the arrangement disclosed and claimed in my U. S. Letters Patent 2,493,-994, issued January 10, 1950.

The tire chain assembly is comprised of a ring 12 formed from one piece of resilient metal and having ends 12a and 12b which are adapted to be received by the locking hook 10. A plurality of cross-links 13 are secured to the ring 12 by way of loops 14 formed by deforming the ring 12 during manufacture. Movement of the cross-chains or links 13 on the ring 12 is avoided by sliding over each of the humps or loops 14 a link 15, which may be a standard chain link, prior to the connection of the cross-chains to the ring. This manner of assembly avoids the need for welding the cross-chains to the ring and allows the cross-chains to swivel and slide with limited motion without binding. The construction permits the ready replacement of cross-chains which may become worn during use and makes possible a simple and inexpensive mode of assembly of tire chains embodying the invention of my aforementioned patent.

Referring to Fig. 2 the locking hook 10 is shown comprised of a body portion 16 having slots 17 and 18 formed in opposite ends thereof for receiving links or loops 19 and 20 respectively, illustrated in phantom. The slot 17 although illustrated to be of the open-ended type may be formed by punching an aperture through the end of the body portion 16. However, there is an advantage in providing an open-ended slot since the hook-like section 21 may be bent out of the plane of the body portion to permit the addition of loop 19 and subsequently bent back to the position illustrated, thereby effectively locking the loop 19 within the slot 17. Removal of the loop 19 thereafter may be had merely by again bending the section 21 so to enlarge the portion 17a of the slot to a size larger than the diameter of the material comprising the loop 19. Thus, the hook assembly may readily replace existing latches or may be transferred from one assembly to another.

The other part or link 20 to be connected by the locking hook 10 is received in the slot 18 which is illustrated to be of an open-ended type and substantially L-shaped in configuration. After the part 20 has been received by the slot 18, it is moved to the position in the toe of the slot and a closure member 22 pivotally mounted as at 23 is moved about its pivot from the position shown in Fig. 2 to block or otherwise close the open end of the slot 18. The closure member 22 is comprised of a single piece of resilient sheet metal bent into substantially U-shaped configuration (Fig. 5) to form portions or legs 24, 25 disposed at opposite sides of the body portion 16. Each of the legs 24 and 25 is provided with a longitudinal slot 26 (Fig. 2) which mounts or receives a locking means 28 for slidable movement within the confines thereof.

The clockwise rotation of the closure member 22 about its pivot 23 into a closed position is limited by the locking means 28 so that it assumes in its closed position the relation to the body portion 16 illustrated in Fig. 3. In this respect, the locking means 28 operates as a stop in conjunction with the body portion 16 to limit the movement in one direction of the closure member 22. The stop function may also be provided by the body portion and the base 22a of the closure member 22.

One end of the closure member 22 adjacent the L-shaped slot 18 is provided with a sloping surface 29 which is subject to being contacted by the end of the loop or link 20. Such contact will result in a moment of force which will tend to cause the closure member 22 to rotate about its pivot 23 in a clockwise direction, resulting in the locking means 28 engaging the body portion 16 with greater force. Thus, vibration tending to cause relative movement between the parts connected by the hook 10 will cause the closure member always to move in a direction of the closed or part retaining position and all the more firmly to maintain the locking engagement. This feature is of particular significance when the locking hook is used as a securing device for tire chains where large forces are developed during starting and stopping. These forces cause relative movement between the ends 12a and 12b (Fig. 1) which but for the features of the present invention might cause a securing device to become unlatched.

The locking means 28 is illustrated (Fig. 5) to comprise a shaft 30 and oppositely disposed enlarged head portions 31 and 32. The shaft 30 is preferably of a size equal in diameter to the width of the slot 26, and the head portions, of course, should be and are of size substantially greater than that of the slot. The locking means may be very simply constructed of a rivet and a washer swaged on one end in spaced relation to the head thereof.

In performing the function of locking the closure member against movement, the locking means 28 cooperates with the slots 26 and an open-ended slot 33, formed in a substantially mid portion of the body member 16. The slots 26 and 33 are in substantial alignment when the closure member is moved to its closed position (Fig. 3) and, accordingly, extend in the same direction. The locking means 28 may then be moved along the slot 26 and into the toe of the L-shaped slot 33 where it mutually engages portions of the body member 16 and the closure member 22 to lock the closure member against movement (Fig. 4).

Although as set forth above vibrations causing relative movement between the link 20 and the body member 16 will in all cases tend to move the closure member into a closed position, provision has been made to augment this feature by providing in the construction of the closure member itself means for inhibiting a movement of the locking means 28 out of its locking position. This means is provided by deforming or otherwise providing a hump or a bulge 34 in each of the legs 24 and 25 of the closure member 22. The expanded width between the outer sides of the bulges 34 is of a dimension greater than the distance along the shaft 30 between the enlarged heads 31, 32 of the locking means 28. In order to move the locking means 28 into and out of its locking position, and, therefore, along the closure member 22, it is necessary that the bulges be deformed and their expanded width contracted. Although the force necessary to require this deformation may be by design made quite small in magnitude by proper selection of resilient material comprising the closure member, it has been found adequate to prevent the movement of the locking means relative to the closure member by forces due solely to vibration of the locking hook and its parts and yet permits with extreme ease the locking and unlocking of the closure member.

In operation, the hook member will usually be connected to the link or loop 19 and the link 20 will be placed within the L-shaped slot 18. Thereafter, the closure member 22 will be rotated in a clockwise direction from the position illustrated in Fig. 2 to that position shown in Fig. 3 where its movement is halted by engagement of the locking member 28 or the base portion 22a with the body member 16. The open end of the slot 18 will be closed and the link 20 will be effectively enclosed within the slot and fixed to the hook member 10. The locking means 28 is then moved from one end of the slot 26 past the bulges 34 to the other end of the slot and assumes the position illustrated in Fig. 4, whereupon the closure member 22 will be locked against movement.

Now that one embodiment of the present invention has been fully described, it will be apparent that many modifications may be effected within the scope of the present invention. For example, there is illustrated in Fig. 6 a modified form of closure member 40 which differs from that of Figs. 2–4 in that it is comprised of two separate sheet metal portions 41 and 42. A single sheet metal portion may be used effectively. The first described embodiment is preferred over the latter in that it may be manufactured in a single stamping operation and is of more rigid construction. However, the closure member 40 after assembly with the body portion 16a operates in just as effective a manner as the closure member 22. In all other respects, the closure members 22 and 40 are similar.

Although the locking hook 10 has been illustrated and above referred to in conjunction with a tire chain, it will be understood and made apparent from the following description that it will find application and use as hardware in the nautical and other arts and because of its simple construction may be reduced considerably in size to find use as a clasp or locking arrangement for securing such items of jewelry as necklaces and bracelets.

What is claimed is:

1. A locking hook for parts to be connected comprising a body portion for directly interconnecting said parts and having an open-ended slot at one end thereof for releasably receiving one of the parts, a closure member pivotally mounted free of attachment to said parts on a side of said body portion and in a closed position extending in one direction over a portion of said slot for substantially closing the open end thereof, said closure member being provided with a slot in a portion thereof extending in an opposite direction, said body portion having an aperture extending in the same direction as said slot in said member when said member is in a closed position, and means passing from one side of said closure member to an opposite side of said body portion and slidable along said slot of the closure member and said aperture of said body portion in one direction to free the closure member for movement about its pivotal axis to open the end of said open-ended slot and slidable in an opposite direction with respect both to said body portion and said closure member to mutually engage portions of said body portion and said closure member to maintain said closure member in a closed position.

2. A locking hook for parts to be connected comprising a body portion for directly interconnecting said parts and having an open-ended slot at one end thereof for releasably receiving one of the parts, a closure member pivotally mounted free of attachment to said parts on a side of said body portion and in a closed position extending in one direction over a portion of said slot for substantially closing the open end thereof, said closure member being provided with a slot in a portion thereof extending in an opposite direction, said body portion having an aperture extending in the same direction as said slot in said member when said member is in a closed position, means passing from one side of said closure member to an opposite side of said body portion and slidable with respect to both said body portion and said closure member along said slot and said aperture in one direction to free the closure member for movement about its pivotal axis to open the end of said open-ended slot and slidable in an opposite direction to mutually engage portions of said body portion and said closure member to maintain said closure member in a closed position, and means for preventing the free movement along the slot of said locking means after it has been moved to a locking position.

3. A locking hook for parts to be connected comprising a body portion having an open-ended slot at one end thereof for receiving one of the parts, a closure member pivotally mounted on a side of said body portion and in a part-retaining position extending in one direction over a portion of said slot for substantially closing the open end thereof, said member provided with a slot in a portion thereof extending in an opposite direction, said body portion having an aperture extending in the same direction as said slot in said member when said member is in a part-retaining position, and means passing from one side of said closure member to an opposite side of said body portion and slidable along said slot and said aperture in one direction to free the closure member for movement about its pivotal axis to open the end of said open-ended slot and slidable in an opposite direction to mutually engage portions of said body portion and said closure member to maintain said closure member in a part-retaining position, said closure member having a resilient deformed portion intermediate the ends of its slot for preventing the free movement along the slot of said locking means after it has been moved to a part retaining position.

4. A locking hook for parts to be connected comprising a body portion having an open-ended slot at one end thereof for receiving one of the parts, a closure member comprising a pair of separate spaced legs pivotally mounted on opposite sides of said body portion and in a closed position extending in one direction over a portion of said slot for substantially closing the open end thereof, said legs provided with a slot in portions thereof extending in an opposite direction, said body portion having an aperture extending in the same direction as said slots in said legs when said member is in a closed position, and means passing through said legs and slidable along said slots and said aperture in one direction to free the closure member for movement about its pivotal axis to open the end of said open-ended slot and slidable in an opposite direction to mutually engage portions of said body portion and said legs to maintain said closure member in a closed position, said legs each having a resilient deformed portion intermediate the ends of its slot for preventing the free movement along the slot of said locking means after it has been moved to a locking position.

5. A hook-latch comprising a body member having spaced slots extending inwardly from an edge of said member and thence substantially parallel to said edge, one of said slots being suited to receive a part to be connected to said hook-latch, a closure member pivoted to said body member intermediate said slots and having end portions which for the part-retaining position of said closure member concurrently extend over said slots, and a locking member slidably carried by one of said end portions of said closure member and movable with respect both to said body member and said closure member to a position in which it cooperates with the other of said slots to preclude rotation of said closure member both under conditions of slack and tension.

6. A hook-latch as in claim 5 in which the other end portion of said closure member has a sloping surface effective upon engagement by said part to increase the holding pressure of said locking member.

7. A hook-latch comprising a body member having a pair of spaced parallel slots extending inwardly toward the center of said member and thence extending in substantial alignment with one another and substantially parallel to an edge of said body member, one of said slots being suited to receive a part to be connected to said hook-latch, a closure member pivoted to said body member intermediate said slots and having end portions which for the part-retaining position of said closure member concurrently extend over said slots, and a locking member slidably carried by one of said end portions of said closure member and movable with respect both to said body member and said closure member to a position in which it cooperates with the other of said slots to preclude rotation of said closure member both under conditions of slack and tension.

8. A locking hook comprising a body member having two open-ended slots extending in opposite directions from an intervening portion of said body member, one of said slots being suited to receive a part to be connected, a closure member pivotally attached intermediate its ends to said intervening portion of said body member, one of said ends of the closure member substantially closing said one of the slots of the body member for the closed position of said closure member, the other end of said closure member having a closed slot in alignment with the other of said slots of the body member for the closed position of said closure member, and a locking member slidably mounted in said slot of the closure member, said locking member for the closed position of said closure member being slidable in one direction in said then aligned slots of said body and closure members to a locking position precluding pivotal movement of said closure member from its closed position and being slidable in opposite direction out of said other slot of the body member to permit pivotal movement of said closure member to its open position for opening of said one of the slots of the body member.

9. A locking hook as in claim 8 in which said pivoted closure member is of resilient strip material and is outwardly bowed along said slot thereof to preclude movement of said locking member in said opposite direction except upon application to said locking member of force sufficient to flatten the bow of the closure member.

References Cited in the file of this patent

UNITED STATES PATENTS

| Re. 14,783 | Johnson | Dec. 30, 1919 |
| 1,235,682 | Gunnoe | Aug. 7, 1917 |
| 1,540,030 | Mestars | June 2, 1925 |
| 2,625,976 | Reynolds | Jan. 20, 1953 |